United States Patent [19]
Wilson et al.

[11] Patent Number: 5,940,234
[45] Date of Patent: Aug. 17, 1999

[54] HEAD INSTABILITY RECOVERY METHOD FOR A DISK DRIVE

[75] Inventors: Brian D. Wilson, Boulder; Bruce D. Emo, Niwot, both of Colo.

[73] Assignee: Mobile Storage Technology Inc., Boulder, Colo.

[21] Appl. No.: 08/193,324

[22] Filed: Feb. 8, 1994

[51] Int. Cl.⁶ .................................................. G11B 5/09
[52] U.S. Cl. ................................................ 360/53; 360/31
[58] Field of Search .................................. 360/53, 46, 32, 360/31, 67, 7; 369/54; 371/163; 364/466

[56] References Cited

U.S. PATENT DOCUMENTS

| | | | |
|---|---|---|---|
| 4,578,721 | 3/1986 | Brannan, Jr. | 360/53 X |
| 4,637,023 | 1/1987 | Lounsbury et al. | 360/53 X |
| 4,837,702 | 6/1989 | Obrea | 364/466 |
| 4,933,783 | 6/1990 | Yasui | 360/46 X |
| 5,053,892 | 10/1991 | Supino, Jr. et al. | 360/62 |
| 5,121,260 | 6/1992 | Asakawa et al. | 360/53 X |
| 5,121,262 | 6/1992 | Squires et al. | 360/46 |
| 5,345,430 | 9/1994 | Moe | 360/7 X |
| 5,379,162 | 1/1995 | Cunningham et al. | 360/53 |

*Primary Examiner*—Michael Tokar
*Assistant Examiner*—Patrick Wamsley
*Attorney, Agent, or Firm*—Skjerven, Morrill, MacPherson, Franklin & Friel LLP

[57] ABSTRACT

A method of recovering a read/write head in a metastable state employs a retry algorithm which uses a combinatorial approach, i.e., parameters are altered step-by-step, and the retry algorithm is operational for a predetermined time. The method also employs an auxiliary write operation that utilizes a predetermined spare data sector on a track, another sector of which includes data. In this spare data sector, the corrective write/cycling operation can occur without requiring any seek operations and without overwriting of prerecorded data. In addition, the present method may include the step of moving the arm on which the head is mounted to a remote or crash position relative to a magnetic medium such as a disk, and, if so chosen, forcing a write operation with the head in that position.

8 Claims, 2 Drawing Sheets

HEAD INSTABILITY RECOVERY METHOD FOR A DISK DRIVE

FIELD OF THE INVENTION

This invention relates to disk drive apparatus, including magnetic read/write heads.

BACKGROUND OF THE INVENTION

Magnetic read/write heads in a disk drive system including a magnetic medium are subject to a phenomenon known as "domain pinning" which causes the head to enter a metastable state resulting in unbalanced magnetization. This condition inhibits efficient reading and recovery of pre-recorded data. In particular this problem affects disk drive heads having narrow recording track width and a structure with relatively few magnetic domains.

Typically, if error correction circuitry is unable to appropriately correct errors read, the reading operation can be retried in different ways before ending the operation and recording the error. The algorithm used by the system generally attempts a number of possible methods available (and allowed by the host computer), determined by the type of operation and the cause of the error.

Commonly, the retry algorithm executes, for example, four or five steps, and if the steps are unsuccessful, repeats the same several steps a predetermined number of retries before reporting an error. As an example, in Supino et al., U.S. Pat. No. 5,053,892, if errors are found to be uncorrectable after a fifth attempt at error correction, the block of data is declared uncorrectable.

Using a set number of retries sacrifices the aggressiveness of the recovery algorithm. That is, if more time is available to attempt retries, a more efficient use of that time would be for the retry algorithm to operate during the time available to attempt additional, and perhaps varied retries.

It is especially difficult to mix recovery methods that take different amounts of time.

It is well known that if the magnetic head is temporarily energized in a cyclical write state, it may randomly relax to a stable and symmetrical domain state (i.e., be recovered), which then allows normal reading and data recovery, as described for example in U.S. Pat. No. 5,053,892 to Supino et al.

Supino et al. teach moving the read/write head via a seek command to a remote auxiliary track location which contains no data, and there performing a randomized write operation. Then, a return seek operation is undertaken to find the desired sector to be read, and it is then determined if the head reads the data properly. This procedure requires on the average a period of time equal to 2 times (average seek time plus the average rotational latency time of the disk). Since the process is not stochiastic, the operation may need to be repeated to obtain the desired domain state, resulting in an undesirably long data recovery procedure.

A further problem is that a disk drive utilizing pre-recorded sector information may be unable to decode subsequent sector information when the read/write head enters the undesirable metastable state immediately following a data information write operation. In this condition the disk drive is dysfunctional and diagnostic writing procedures cannot be achieved.

Of more general interest is U.S. Pat. No. 5,121,262 to Squires et al.

SUMMARY OF THE INVENTION

In a general feature of the invention, an improved method of recovering a read/write head in a metastable state employs a retry system which retries parameters in different combinations as chosen during a set period of time, rather than a set number of retries. The method also employs an auxiliary write operation that utilizes a predetermined spare data sector on a track, another sector of which may include data. In this spare sector the corrective write/cycling operation can occur without requiring any seek operations and without overwriting of pre-recorded data, at the same time minimizing the rotational latency time. In addition, the present method may include the step of moving the arm on which the head is mounted to a remote position relative to a disk, and, if so chosen, forcing a write operation with the head in that position.

DESCRIPTION OF THE DRAWINGS

Objects of the invention will become apparent from a study of the following specification and drawings, in which.

DESCRIPTION OF THE PREFERRED EMBODIMENT

Figure 1:
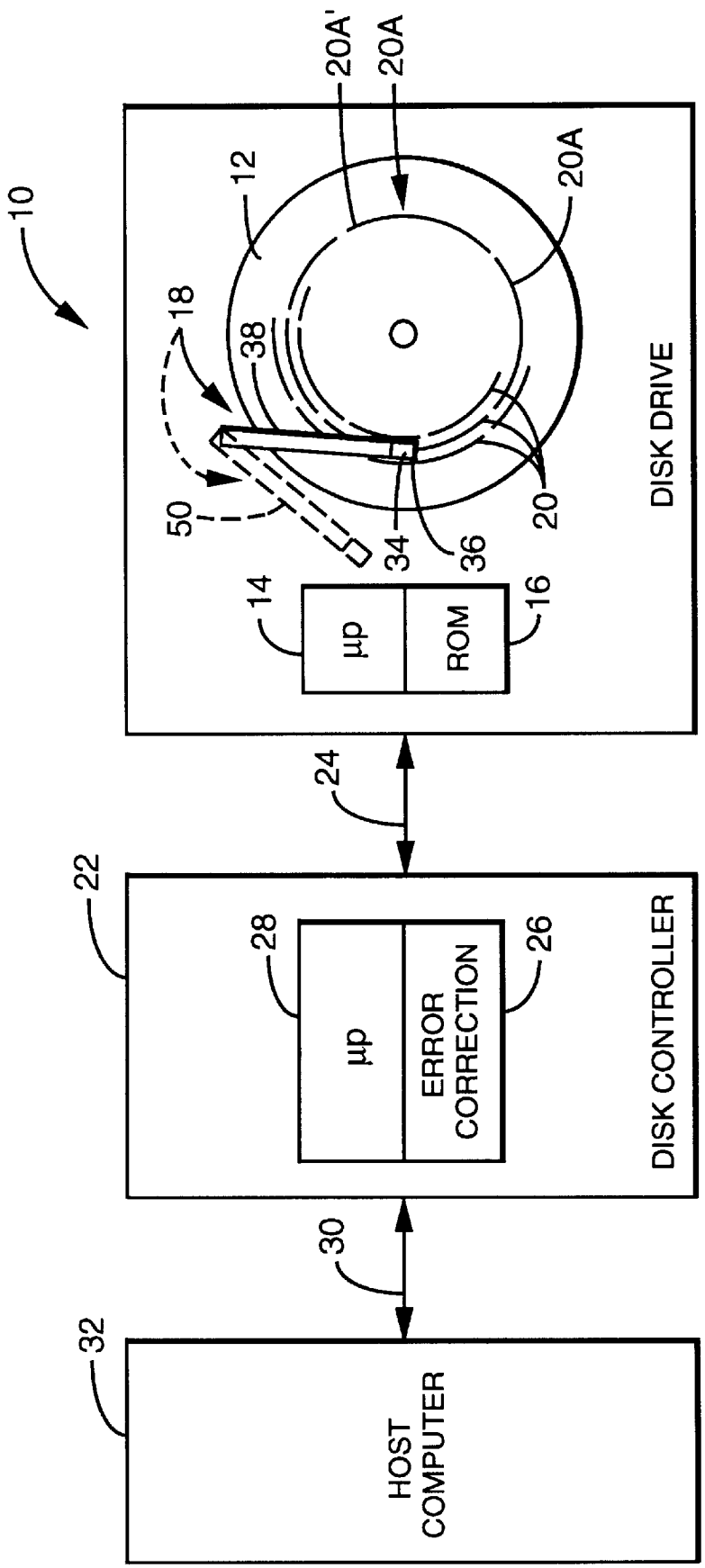
FIG. 1 is a block diagram of a host computer and a disk storage system.

Referring to FIG. 1, a disk drive unit 10 includes at least one rotating magnetic disk 12. A microprocessor 14 and read-only-memory 16 control the operation of a read/write head assembly 18 to in turn cause it to read and write bits of data in a track 20 (of a plurality thereof) on the magnetic disk 12 in response to instructions from a disk controller 22 provided through link 24. Link 24 also carries bits back and forth between the disk controller 22 and disk drive 10, and carries status information from the disk drive 10 back to the disk controller 22.

The disk controller 22 includes error correction circuitry 26 which implements an appropriate error correction code with respect to bits being sent to the disk drive 10 for storage and with respect to possible corruptive bit sequences read from the disk 12. A microprocessor 28 governs the delivery and receipt of bits, instructions and status information by link 24 and also communicates by a link 30 with a host computer 32.

Each surface of a magnetic disk 12 is organized in concentric tracks 20. The read/write head assembly 18 includes at least one head 34 mounted on a slider 36 which is supported on an arm 38 as shown. The slider 36 moves above the disk 12 with the poles of the head 34 positioned to read or write on a desired track.

If the error correction circuitry 26 is unable to appropriately correct errors read, the reading operation can be retried in different ways before ending the operation and reporting the error. The algorithm used by the system generally attempts a number of possible methods available (and allowed by the host computer) in a reasonable amount of time. The method of retry is determined by the type of operation and the cause of the error.

The most common retry algorithm is to execute, for example, a few steps and if these steps are unsuccessful, to repeat those few steps a number of retries before reporting an error. In the case of data read errors a mathematical recovery method is often tried, but other errors simply result in execution of a sequence of predetermined steps.

As set forth above, using a set number of retries before failing an operation sacrifices the aggressiveness of the recovery algorithm to prevent exceeding an implied time limit (i.e., if more time is actually available, it is often appropriate to continue use of the recovery algorithm during that time). As an example, in Supino et al. cited above, if errors are found to be uncorrectable after a fifth attempt at error correction, the block of data is declared uncorrectable.

The present system uses a timer to determine how long the recovery process will continue, and allows the execution of a number of recovery methods without risk of violating operation time limits. Thus, the present recovery process is based on a time limitation rather than a set number of retries. This greatly increases the flexibility, aggressiveness and effectiveness of the operation.

A read operation can be retried with several recovery methods, used in varying combinations to improve their effectiveness. This complex process can easily be implemented in a recovery system governed by a time limit rather than a set of retry attempts. Instead of using a retry counter to indicate a failure point, it is used as an index for a table driven recovery algorithm.

Table I below contains an entry for each successive retry that indicates the combination of recovery methods and parameters. If the retry is not successful the retry count is incremented, and the next entry in Table I directs the next retry. When the end of Table I is reached before the time allowed for the operation has expired, the process can be continued from the beginning of Table I. Note that the entries in Table I set forth various combinations of settings of the listed headings, chosen as appropriate to the overall operation.

By way of explanation of the headings, "off-track" relates to the head being incrementally offset from what is thought to be the center line of the track. "FW ECC" refers to a "firmware error correction code" i.e., each sector includes an error correction code symbol therein, which can be used to determine whether the data is in error. In some cases the error correction code can be used to correct the data. "Strobe" relates to the time during which a bit value is looked for, while "threshold" refers to the amplitude of the signal sensed when looking at a bit. The "strobe" and "threshold" together create a window for sensing of a 1 or a 0. "Filter" refers to the reduction of intersymbol interference, i.e., it involves changing the channel bandwidth to separate intersymbol interference caused by closeness or interaction. "Sweep" relates to the long stroke of the head, as in a long seek, while "domain fix" relates to, for example, performing a write operation with the arm in a remote rest position or on a spare sector, as further herein described.

TABLE I

| retry # | off-track | FW ECC | strobe | threshold | filter | sweep | domain fix |
|---|---|---|---|---|---|---|---|
| 0 | no | no | normal | normal | normal | no | no |
| 1 | no | no | normal | normal | normal | no | no |
| 2 | no | no | normal | normal | normal | no | no |
| 3 | no | yes | normal | normal | normal | no | no |
| 4 | +1 step | no | normal | normal | normal | no | no |
| 5 | −1 step | no | normal | normal | normal | no | no |
| 6 | no | no | +1 | +10 | normal | no | no |
| 7 | no | no | −1 | −10 | normal | no | no |
| 8 | no | yes | normal | normal | normal | yes | yes |
| 9 | no | no | normal | normal | +5 | no | no |
| 10 | +2 steps | yes | normal | normal | normal | no | no |
| 11 | −2 steps | yes | normal | normal | normal | no | no |
| 12 | no | no | +2 | normal | +5 | no | no |

TABLE I-continued

| retry # | off-track | FW ECC | strobe | threshold | filter | sweep | domain fix |
|---|---|---|---|---|---|---|---|
| 13 | no | no | −2 | normal | +5 | no | no |
| 14 | no | yes | +3 | +5 | +2 | no | no |
| 15 | no | yes | −3 | −5 | +2 | no | no |

The parameters in Table I may be absolute values, adjustments to a present value, or values optimized for each drive by the manufacturing process or by the drive while in operation. The steps in Table I should be arranged so that the fastest and most likely to succeed combinations are first in the Table. The combination that works may be used to recover only the sector in error, the remainder of a track, or until a new command or another error occurs.

Table I may contain several unchanged retries at the start, or may include steps to be used only after a period of unchanged retries has been unsuccessful.

If the host computer 32 has requested a reduced number of retries a small portion of Table I containing optimizing steps may be used to execute a minimum number of recovery attempts.

As noted, Table I deals with read errors. It will be readily understood that an appropriate Table for dealing with write errors may be provided.

Figure 2:
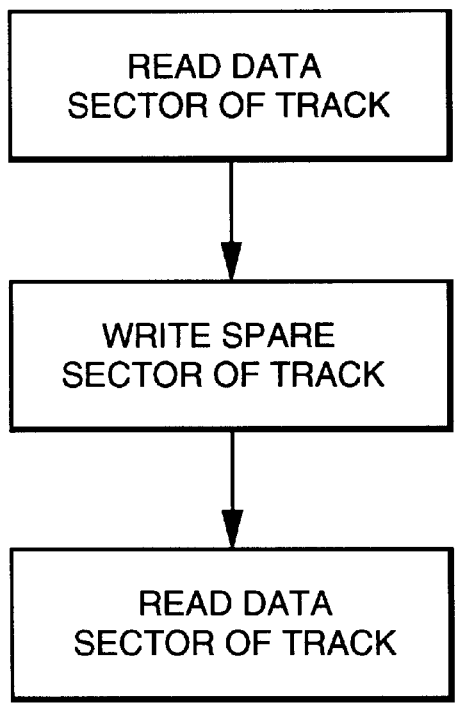
FIG. 2 is a flow chart of a first procedure for conditioning a read/write head.

Referring to FIGS. 1 and 2, the track 20A includes (as may other tracks) a spare or "unused" sector 20A', i.e., unused for normal reading and writing of data to and from the disk 12, in addition to the data sectors $20A_1$, $20A_2$, etc., used for normal reading and writing of data. With further reference to FIG. 2, the sector 20A' may be written without danger to the surrounding data on the sectors $20A_1$, $20A_2$, etc. of the track 20A. This act of writing on the spare sector 20A' of the track 20A is capable of reconfiguring the magnetic domains of the head 34 and thus returning the head 34 to a condition to which it can read data from the sectors $20A_1$, $20A_2$, etc. of the track 20A. This system thus reduces the number of uncorrectable read errors.

Because the reconfiguring of magnetic domains takes place by writing on the spare sector 20A' of the track 20A, the head 34 need not be moved to a remote position from the track 20A and thus, after such write operation, can with minimum delay read the data on the sectors $20A_1$, $20A_2$, etc. Additionally, if any sector 20A is deemed defective, it is relabeled as 20A', while previous sector 20A' is relabeled as $20A_n$, allowing the user data to be relocated without moving to another track.

By using a predetermined spare sector on each data track, the diagnostic write cycling operation can occur without requiring any seek operations or overwriting of re-recorded data, at the same time minimizing the rotational latency time.

This system thus overcomes the problem disclosed in U.S. Pat. No. 5,053,892 to Supino et al. as described above, wherein the read/write head is moved to a remote auxiliary track location, and then moved back to the desired track, resulting in a large delay in operation.

Furthermore, once the head has entered the metastable state, the head may be unable to resolve properly the identification information field of the sector information record due to the high spatial frequency of recorded information transitions, and thus would not normally be allowed to write for fear of corrupting pre-recorded information. In the present system, the servo burst information included in the sector information record has a much lower spatial frequency which can be resolved by a head in the metastable condition. Using the recovered servo field information the servo microcontroller locates the spare sector and commands the head 34 to perform a sector format operation which effectively causes the head 34 to switch to a large number of alternating cycles, thus placing it in a condition to properly read the pre-recorded information on the track.

Figure 3:
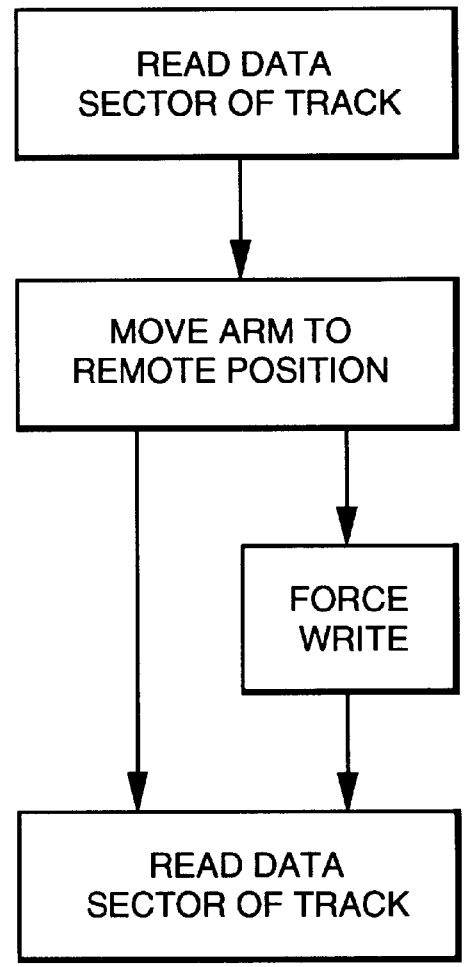
FIG. 3 is a flow chart of a second procedure for conditioning a read/write head.

With reference to FIG. 3, another recovery method which may be used to advantage when the servo field is not readable, and in fact may be useful in a disk drive without spare sectors, is to remove the head 34 from the disk 12 surface and then perform a write operation in its removed position 50. This involves moving the arm 38 to a remote rest position 50 relative to the disk 12 and forcing a write operation thereon with the arm 38 in its remote rest position 50. Because the head 34 is not in close proximity to the disk 12 there is no danger that pre-recorded information will be inadvertently overwritten. In the case when there is no remote rest stop, the arm on which the head is mounted can be moved to an inner or outer crash stop and a forced write operation undertaken without danger that pre-recorded information will be inadvertently overwritten.

At the end of this forced write operation the head 34 is returned to the disk 12 surface and normal operations are resumed.

In furtherance thereof, it has been found that by moving the arm 38 through a large arc (for example to its rest position on a ramp), and then (without a write operation) positioning the arm 38 with regard to a desired track for reading or writing thereof, mechanical system errors such as positioning error may be overcome.

Once errors are reduced by the above recovery method, if errors are sensed in the reading of a track, retrying of the operation can take place in accordance with the procedure described above in relation to Table I. However, it will be understood that the various methods, subsets or supersets thereof described herein can be used in any order as chosen.

We claim:

1. A method of conditioning a magnetic read/write head adapted for use with a storage medium, said method comprising the steps of:
   causing said head to perform a read operation on a track of a storage medium;
   determining whether said read operation resulted in a read error; and
   selectively causing said head to perform subsequent recovery operations for any said read error, the number of said subsequent recovery operations being determined by a specific amount of time from the initiation of said subsequent recovery operations.

2. The method of claim 1 wherein said subsequent recovery operations are performed on said track.

3. The method of claim 1 wherein said subsequent recovery operations include the steps of varying operating parameters of said magnetic read/write head and/or storage medium.

4. A method of conditioning a magnetic read/write head adapted for use with a storage medium, said method comprising the steps of:
   causing said head to perform an operation on a first sector of a track on a storage medium;
   determining whether said first operation resulted in an error; and
   if said error occurred, moving said head to a remote position relative to said storage medium and again causing said head to perform said operation on said track of said storage medium.

5. The method of claim 4 wherein said head is moved to a remote rest position relative to said storage medium.

6. The apparatus of claim 4 and further comprising the step of performing a second operation with said head in said position.

7. The apparatus of claim 6 wherein said first-mentioned operation comprises a read operation.

8. The method of claim 6 wherein said second operation comprises a write operation.

* * * * *